United States Patent
Bohata (10) Patent No.: US 6,705,823 B2
(45) Date of Patent: Mar. 16, 2004

(54) VEHICLE FOR LIFTING AND TRANSPORTING CONTAINERS

(76) Inventor: John F. Bohata, 308 Lake Ave. South, Nesconset, NY (US) 11767

( * ) Notice: Subject to any disclaimer, the term of this patent is extended or adjusted under 35 U.S.C. 154(b) by 0 days.

(21) Appl. No.: 10/078,017

(22) Filed: Feb. 15, 2002

(65) Prior Publication Data

US 2002/0127087 A1 Sep. 12, 2002

Related U.S. Application Data

(63) Continuation of application No. 09/412,714, filed on Oct. 5, 1999, now abandoned, which is a continuation-in-part of application No. 09/039,758, filed on Mar. 16, 1998, now abandoned.

(51) Int. Cl.[7] ............................. B60P 1/48; B60P 1/64
(52) U.S. Cl. ..................... 414/546; 414/491; 414/498; 414/555
(58) Field of Search ................ 414/471, 491, 414/498, 546, 549, 555

(56) References Cited

U.S. PATENT DOCUMENTS

| | | | | |
|---|---|---|---|---|
| 2,308,648 | A | * | 1/1943 | De Vry et al. ............. 414/728 |
| 3,239,080 | A | * | 3/1966 | Corompt .................... 414/541 |
| 4,053,074 | A | * | 10/1977 | Lemaire .................... 414/491 |
| 4,204,793 | A | * | 5/1980 | Lemaire .................... 414/421 |
| 4,350,469 | A | * | 9/1982 | Corompt .................... 414/420 |
| 4,509,894 | A | * | 4/1985 | Rolfe ........................ 414/555 |
| 4,722,651 | A | * | 2/1988 | Antal ........................ 414/24.5 |
| 5,391,043 | A | * | 2/1995 | Bohata et al. ............. 414/544 |
| 5,542,808 | A | * | 8/1996 | Chiron et al. ............. 414/498 |
| 5,803,699 | A | * | 9/1998 | Pinkston .................... 414/498 |

FOREIGN PATENT DOCUMENTS

| | | | | |
|---|---|---|---|---|
| AU | 241319 | * | 8/1960 | ................. 414/491 |
| DE | 3927646 | * | 3/1991 | ................. 414/546 |

* cited by examiner

Primary Examiner—James W. Keenan
(74) Attorney, Agent, or Firm—Galgano & Burke (57) ABSTRACT

A vehicle for lifting and transporting a container which is loaded and unloaded from the rear of the vehicle. The vehicle includes a base assembly attached to the vehicle with a substantially L-shaped boom pivotably attached to the base assembly. The substantially L-shaped boom has two segments connected to one another with a first segment of being pivotably attached to the left side or the base assembly and the second segment being pivotably attached to the right side of the base assembly. Each of the two segments has an upper portion and a lower portion with the lower portions being at an obtuse angle of from over 90° to approximately 140° relative to the upper portions. The pivotable attachment of the boom being attached to the lower portion of each of the segments to the base assembly, so that upon pivoting the boom, the upper portion of each of the two segments is pivoted from a substantially vertical position to a substantially horizontal position during a loading procedure. A lift assembly is pivotably attached to the boom for rearward loading and unloading of a container from the vehicle. The lift assembly includes a lifting element for pivoting the lift assembly relative to the boom.

19 Claims, 8 Drawing Sheets

VEHICLE FOR LIFTING AND TRANSPORTING CONTAINERS

This application is a continuation of application Ser. No. 09/412,714, filed Oct. 5, 1999, now abandoned which, in turn, is a continuation-in-part application of U.S. Ser. No. 09/039,758, filed Mar. 16, 1998, now abandoned.

BACKGROUND OF THE INVENTION

1. Technical Field of the Invention

The present invention relates to vehicles for lifting and transporting containers.

More particularly, the present invention relates to vehicles, also known as haulers, having a novel and substantially L-shaped boom and lift assembly which is attached to a vehicle, in which a tilt plate and a fork frame are operable for both lifting and safely positioning a container on the flat bed portion of the vehicle.

Alternatively, the specially constructed boom and lift assembly is able to utilize a hook lift and hook for loading and unloading containers from the flat bed of a truck.

Irrespective of whether the tilt and fork frames or the hook lift and hook are used for a particular container, the lifting assembly of the invention allows for loading and unloading to directly take place from the rearward end of the truck, thereby avoiding loading and unloading from either the left- or right-hand sides of the truck, or other vehicle, thereby avoiding the inherent safety hazards which are attendant side vehicle loading.

The vehicle of the present invention is also designed to have a lower center of gravity for greater stability than comparable loading trucks currently known to the art.

2. Description of the Prior Art

Containers, such as Dumpsters, have become widely used for containing trash or carrying other articles. Trucks having a front-end, or side-end loader-type mechanism are often used to follow a route on a regular basis, stopping at each container to collect the contents therein.

Due, in part, to the high cost of trucks having a front end, or side, loader-type mechanism, many collectors have resorted to using smaller, lower costing vehicles which have a rear-mounted-type mechanism for transporting fully loaded containers. Such vehicles, however, having a rear-mounted-type mechanism are designed to carry empty containers from one location to another, because transporting fully loaded containers creates a safety hazard. Specifically, a fully loaded container would extend and overhang the rear wheels of the vehicle and raises the center of gravity of the entire vehicle, thereby reducing the weight distribution on the front wheels and thereby resulting in a decrease in the ability to steer the truck.

Mechanisms for loading and transporting a container on a bed of a vehicle, so that it does not overhang the rear end thereof, including Tufenkian et al., U.S. Pat. No. 4,778,327, and Bohata, U.S. Pat. No. 4,943,203.

Tufenkian et al., U.S. Pat. No. 4,778,327, discloses a container lifting mechanism, which is mounted on a fixed flat bed of a vehicle. The lifting mechanism includes a track extending along the length of the bed, a tray which can be moved along the length of the track, and a jack-up assembly (fork lift) attached to, and supported by, the tray. A pair of hydraulic cylinders, attached between the tray and the jack-up assembly, permit forward tilting of the jack-up assembly toward the vehicle cab. In use, the tray carrying the jack-up assembly is moved to the rear of the vehicle. The fork is lowered below the bed and the vehicle is backed towards a container until the fork engages sleeves in the container. The fork is then raised, lifting the container above the bed. The tray is moved by a hydraulic ram toward the truck cab and the jack-up assembly is tilted toward the cab.

Bohata, U.S. Pat. No. 4,943,203, discloses a vehicle mounted container lifting mechanism with the added ability to tilt the bed about 30° by pivotally attaching the bed to the chassis above the rear wheel of the vehicle for the purpose of enabling the lifting fork to be brought closer to the ground.

Carlson, U.S. Pat. No. 3,971,486, discloses a vehicle for transporting roller-type containers, in which a fork lift device is attached to a frame that is pivoted between a vertical position and a position coplanar with the chassis of the vehicle, using multiple lifting means.

Although suitable for their intended uses, the above-identified prior art references are costly and have limited capability for lifting fully loaded containers. Specifically, these devices provide separate means for (1) lifting containers; and (2) positioning the container on the truck bed.

There is a need for a low-cost vehicle for lifting and safely transporting fully loaded containers, which provides the safety of rearward loading and unloading, while maintaining the overall stability and versatility of the vehicle during the loading and unloading procedure.

SUMMARY OF THE INVENTION

It is, therefore, an object of the present invention to provide a vehicle for transporting containers, which may be loaded and unloaded from the rearward end of the vehicle, in which the vehicle is low cost, reliable and operable for lifting and safely transporting fully loaded containers on the vehicle.

It is a further object of the present invention to provide a vehicle for transporting containers, in which the vehicle is provided with a lower center of gravity for greater stability during rearward loading and loading of containers.

It is, still, another object of the present invention to provide a vehicle for lifting and transporting containers, in which the vehicle enables a fully loaded container to be positioned generally between the front and rear wheels thereof utilizing either a hook lift and hook or a tilt plate and fork frame device.

The foregoing and related objects are achieved by the present invention in which a hauler, e.g., flat-bed truck or similar vehicle, is provided with a base assembly and a lift assembly, with the lift assembly preferably comprising either a hook lift and hook, a tilt plate and fork frame apparatus, or both the hook and fork frame apparatus. Both the hook and fork frame means of the invention would be capable of engaging a container, located rearward of the vehicle, in a complementary manner for allowing the container to be loaded onto the vehicle. The present invention further includes a substantially L-shaped boom assembly, which is pivotally attached to a pair of lift plates, which in turn are attached to the left- and right-sides of the base assembly of the vehicle. The boom assembly is arranged (when not loading or unloading a container or the contents thereof) substantially adjacent the passenger cabin of the truck or similar vehicle in order to provide greater stability by virtue of a lowered center of gravity.

The base assembly, preferably, comprises a frame for supporting a container in its loaded position, as well as for supporting the lift assembly of the invention.

The distal end of the base assembly, substantially above the rear fender of the vehicle and opposite the end of the base assembly from that end which is adjacent the passenger compartment, preferably includes, for example, a pair of rollers held in a movable arrangement by respective ear hinges, for allowing a container to be loaded onto, or off of, the base assembly from the rear end of the truck.

The substantially L-shaped boom is constructed with two main segments, each of said main segments having one portion which is upright and substantially adjacent to, and parallel with, the outer, rear surface of the passenger compartment of the vehicle prior to any movement of the boom and lift for loading or unloading of a container or its contents. A lower portion of each segment of the boom is preferably arranged at a slightly obtuse angle (e.g., an angle of greater than 90° to approximately 140°, most preferably, 103.5°), vis-a-vis, the upright portion of each segment. The lower portion of a given segment of the boom assembly extends below, and outside of the base assembly and is pivotally connected with lift plates of the lifting mechanism located on the left- and right-hand sides of the base assembly.

For unloading a container having complementary hook engagement means from the rear end of the vehicle, a hook lift portion of the lift assembly is pivotable for engagement of the hook portion thereof (e.g., an ear hook) with an eyelet, ring, or hook bar of a container. Once, for example, the hook of the invention is engaged with the container, the hook lift of the lift assembly is pivoted in an upwards direction, thereby tilting the container so that a bottom portion of the container, or a multi-body loading element, is able to rest against the pair of rollers located at the rear end of the base assembly. From there, the substantially L-shaped boom assembly is able to be slowly pivoted in a rearward direction from a position adjacent the passenger compartment of the vehicle toward, the rear end of the vehicle. At the same time, the hook lift is able to be lowered so that rollers, or other means for movement, located, or placeable, at the bottom of the container may safely contact the ground rearward of the vehicle and place, at rest, the container behind the vehicle.

In an alternative arrangement for unloading a container from the flatbed portion of the vehicle, the lift assembly includes a fork frame pivotally attached to an inner swing arm of the lift assembly, which, in turn, is pivotally attached to the boom, with a fork frame being attached to a tilt plate for engaging a container. Means for maintaining the tilt plate in a substantially vertical orientation during an unloading procedure and means for pivoting the tilt plate between a substantially horizontal transporting position and a substantially vertical lifting position are included.

For a loading procedure, as opposed to unloading a container from the flatbed portion of a truck, or other vehicle, the foregoing steps would be carried out in reverse order.

In a further preferred embodiment of the present invention, a rotator is provided for the tilt plate and folk frame assembly for allowing the lift assembly to rotate in a continuous 360°-manner for dumping the contents of a container.

In a particularly preferred aspect of the present invention, the lifting folks of the folk frame are horizontally foldable when their use is not required. Such folding of the lifting folks may either be carried out manually or by electrical, or other mechanical, means.

Other objects and features of the present invention will become apparent when considered in combination with the accompanying drawing figures which illustrate certain preferred embodiments of the present invention. It should, however, be noted that the accompanying drawing figures are intended to illustrate only certain embodiments of the claimed invention and are not intended as a means for defining the limits and scope of the invention.

BRIEF DESCRIPTION OF THE DRAWING FIGURES

In the drawing, wherein similar reference numerals denote similar features throughout the several views.

DETAILED DESCRIPTION OF THE DRAWING FIGURES AND PREFERRED EMBODIMENTS

Figure 1:
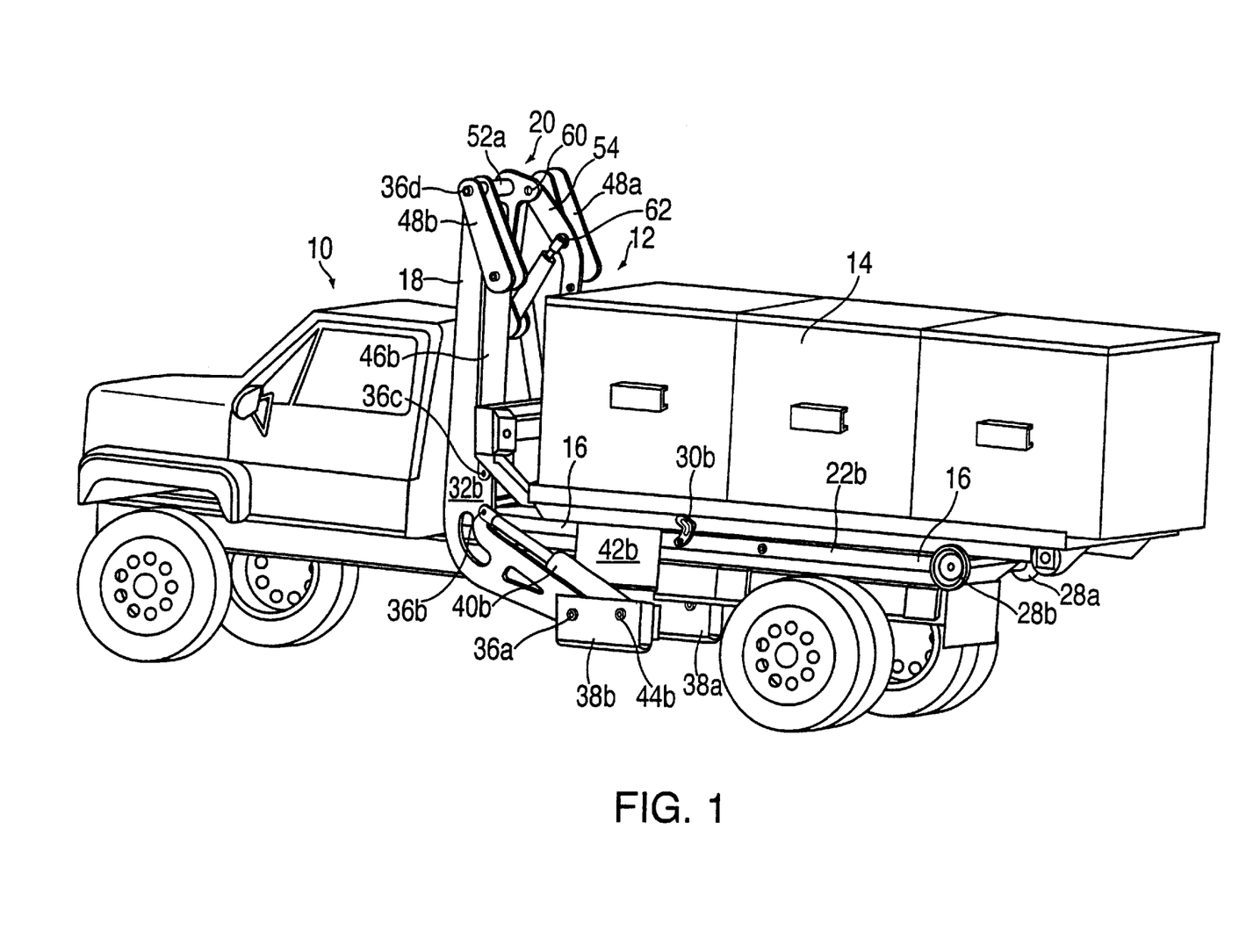
FIG. 1 is a perspective view of a flatbed truck having the lifting and transporting system of the present invention, with a container shown as resting on the base assembly of the lifting and transporting system.

Turning now, in detail, to an analysis of the drawing figures, FIG. 1 provides a perspective view of a flatbed truck 10 having the lifting and transporting system 12 of the present invention, with a container 14 shown as resting on the base assembly of the lifting and transporting system.

Lifting and transporting system 12 is comprised of base assembly 16 (best illustrated in FIGS. 6 and 7), substantially L-shaped boom 18 (i.e., an angle of greater than 90° to approximately 140°, most preferably, 103.5°), and lifting assembly 20, the latter of which includes inner and outer swing arms and a tilt assembly.

Figure 7:
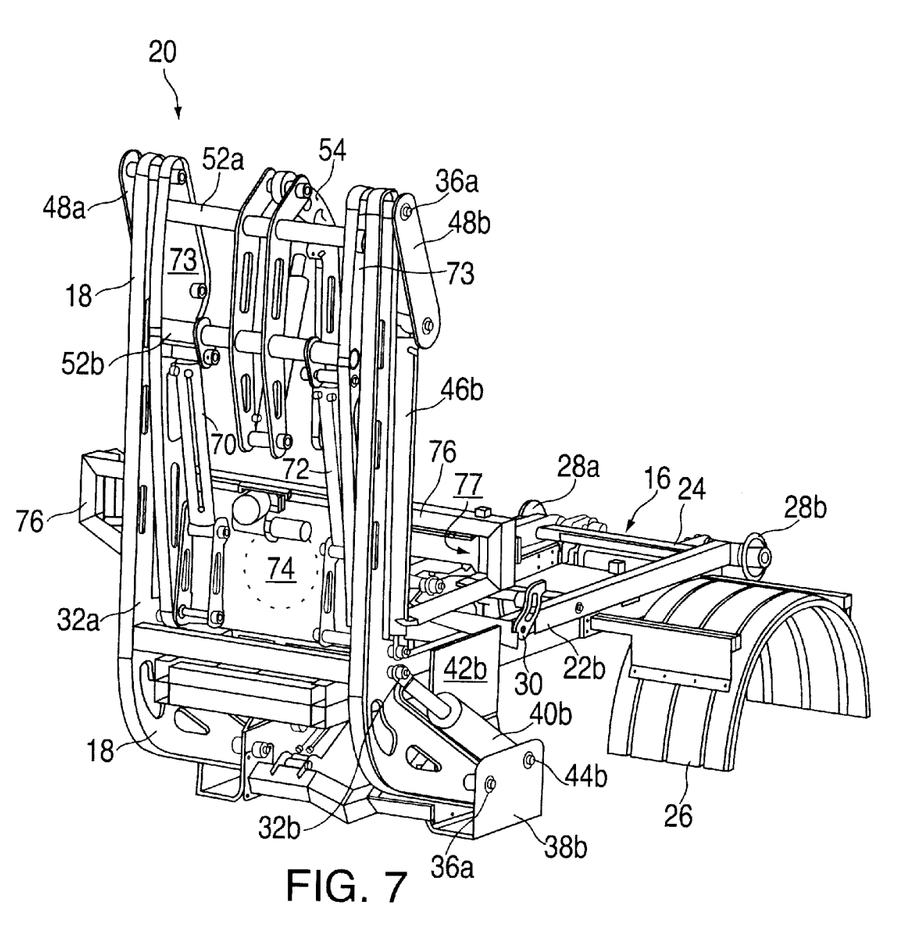
FIG. 7 is a rearward-looking, prospective view of the lifting and transporting system of FIG. 2 of the present invention; and, FIG. 8 is a perspective view illustrating a further preferred embodiment of the present invention, in which a pair of hydraulic cylinders extend from a dump cross-member, located between the left- and right-side lift plates, below the base assembly of the lifting and transporting system for raising, at an angle, a carrying container resting on the base assembly of the invention.

Referring to FIG. 7, base assembly 16, which rests atop of the flatbed portion of a truck is, preferably, comprised of two parallel means 22a, 22b, which are retained in a spaced arrangement by cross-bar 24. At the distal end of base assembly 16, substantially above the rear fender 26 of vehicle 10, and opposite the end of the base assembly from that end which is adjacent the passenger compartment, a pair of rollers 28 is held in a movable arrangement by respective ear hinges for allowing container 14 to be loaded onto, or off of, base assembly 16 from the rear end of the vehicle 10. Base assembly 16 may further include a pair of dump locks 30, along parallel means 22a, 22b, for securing container 14 thereon.

The substantially L-shaped boom 18 is integrally constructed with main two segments 32a, 32b, each of said main segments, in a parallel relationship to one another, having one portion which is upright and substantially adjacent to, and parallel with, the outer, rear surface of the passenger compartment of vehicle 10 prior to any pivoting of the boom and lift assembly 20 of base assembly 16 for loading or unloading of a container 14 or its contents. The substantially L-shaped boom 18 and lift assembly 20, in combination with one another, are pivotable. A lower portion of each segment 32a, 32b of boom 18 is preferably arranged at a slightly obtuse angle, vis-a-vis (e.g., an angle of greater than 90° to approximately 140°, most preferably, 103.5°), the upright portion. The lower portion of a given segment of the boom assembly 18 extends below, and outside of, the base assembly 16.

Figure 3:
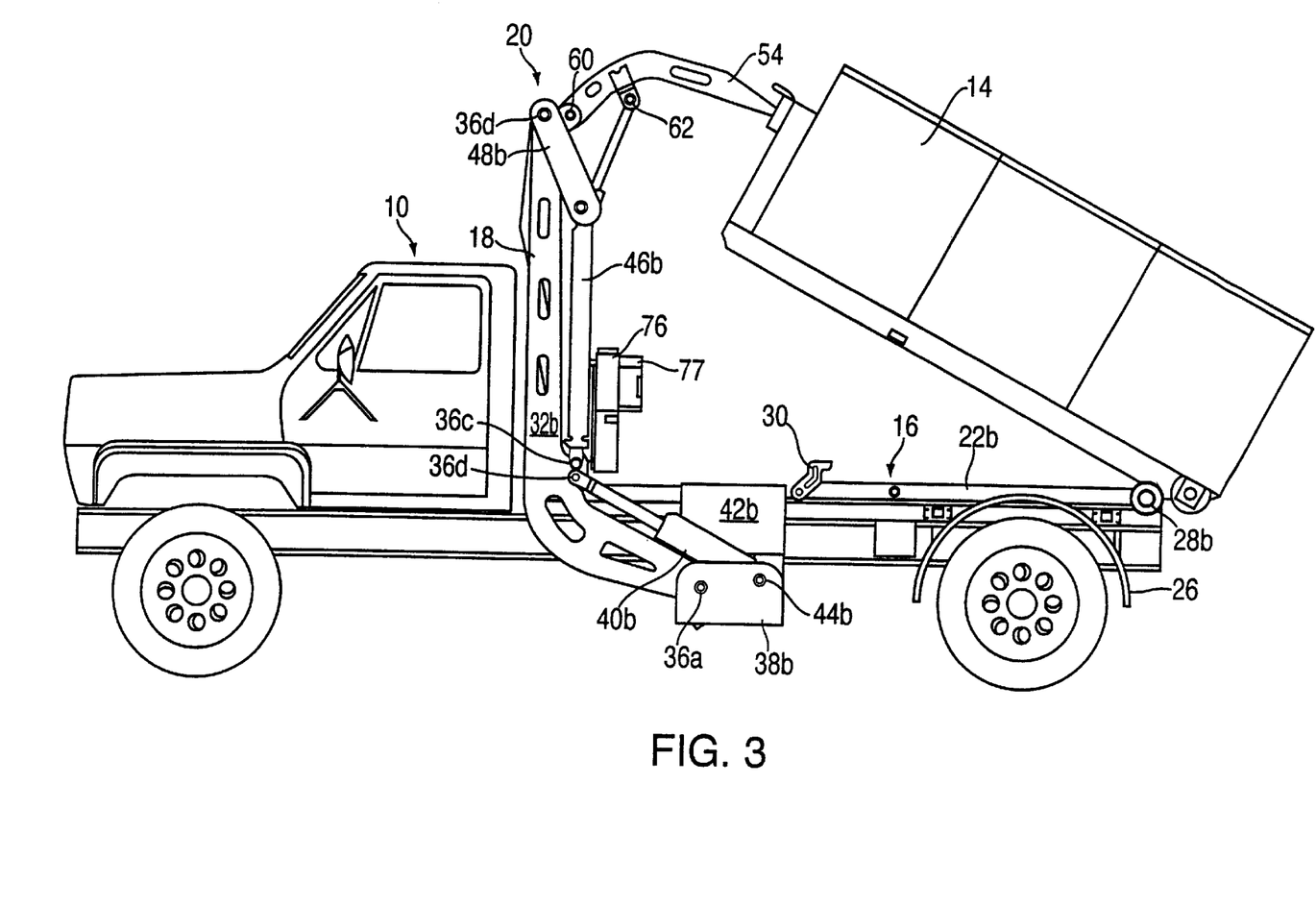
FIG. 3 is an elevational view of the flatbed truck of FIG. 2 showing the hook lift of the lifting assembly as being pivoted upwardly, thereby raising the container at an acute angle to the base assembly of the lifting and transporting system of the invention for eventual unloading of the container from the flatbed truck.
Figure 4:
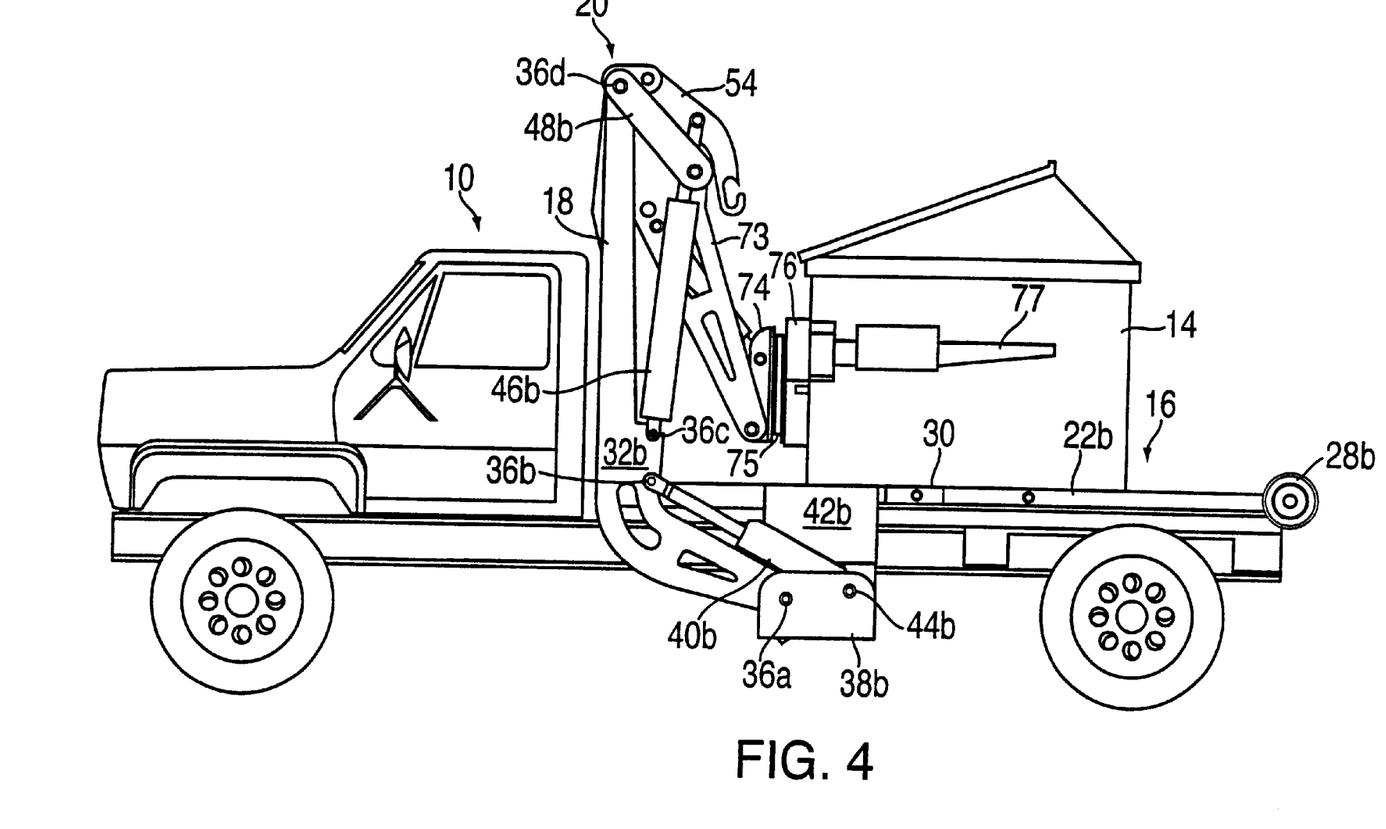
FIG. 4 is an elevational view of the lifting and transporting system of FIG. 1 showing the tilt plate and fork frame arrangement, rather than the hook lift, engaging a container resting on the base assembly of the present invention.

Each segment 32a, 32b (the arrangement for segment 32a of boom 18 is a mirror-image of segment 32b) of boom 18 is preferably provided with four pivot points 36a, 36b, 36c, 36d, as best illustrated in FIGS. 3 and 4. Pivot point 36a is connected with lift plate 38a, 38b (the arrangement for lift plate 38a is a mirror-image of lift plate 38b), which retains a first hydraulic lift cylinder 40b, or other lifting means, and is connected with by lift plate portion 42b, which is integrally connected with lift plate 38b. Lift plate portion 42b at least partially encircles base frame 16. Lift plate 38b, itself, has pivot point 44b, which acts as a lift cylinder anchor and which allows first hydraulic lift cylinder 40b, or other lifting means, to extend and pivot relative to boom 18, by having first hydraulic cylinder 40b connected with boom 18 at pivot point 36b.

Boom 18 further includes pivot point 36c, which is, preferably, closely adjacent to pivot point 36b and which retains, and allows to pivot, a second hydraulic (swing) cylinder 46b. At one end, second hydraulic cylinder 46b is connected by boom 48 at pivot point 36c, while at a second end, hydraulic swing cylinder 46b is connected to outer swing plate 48b at pivot point 50b. Outer swing plate 48b is, itself, connect with boom 18 at pivot point 36d of the boom. Again, a corresponding arrangement, in mirror-image, is found for segment 32a of boom 18.

Figure 5:
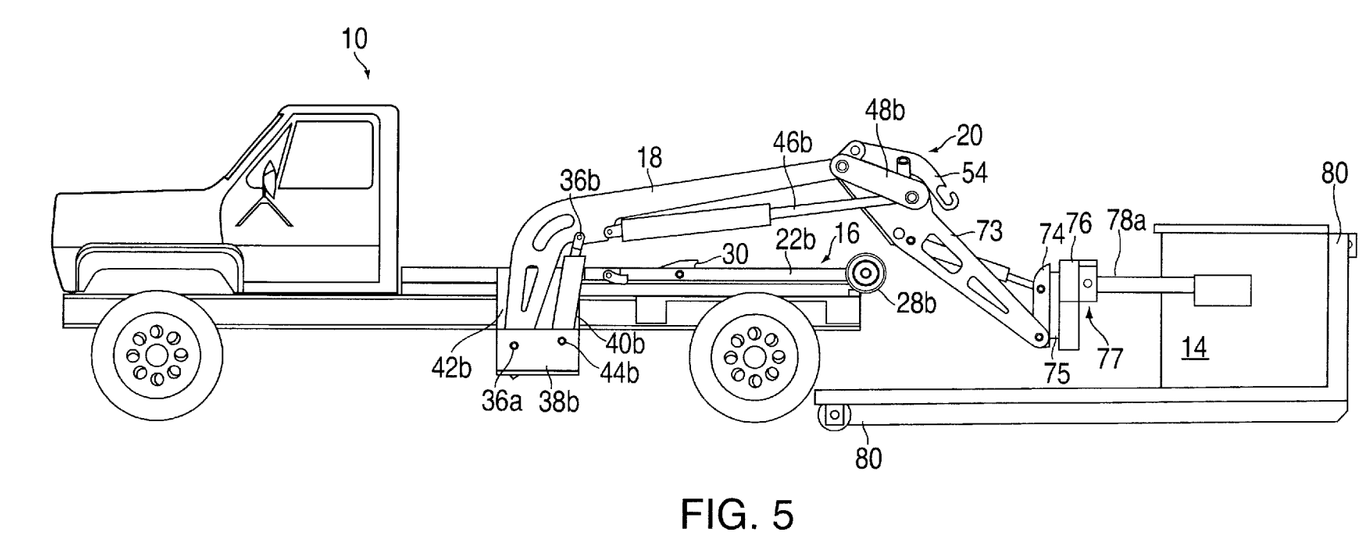
FIG. 5 is an elevational view of the lifting and transporting system of FIG. 4 showing the container of FIG. 4 having been rearwardly unloaded from the base assembly of the present invention.

Referring to FIGS. 1, 5 and 7, each segment 32a, 32b of substantially L-shaped boom 18 is preferably connected by cross-tubes 52a, 52b for supporting lift assembly 20. The lift assembly includes a tilt plate 76 and fork frame 77 arrangement.

Hook lift 54 preferably has two pivot points 60, 62. Pivot point 62 is connected to a third hydraulic cylinder 64, centrally located behind the passenger compartment of vehicle 10, which is capable of extending to lift hook lift, as illustrated in FIG. 3, when the container being loaded or unloaded has an eyelet for a hook. Pivot point 60 is attached, either directly or indirectly, to hook cross-bar tube 52a (see, FIG. 7), which supports hook plate 66.

Figure 2:
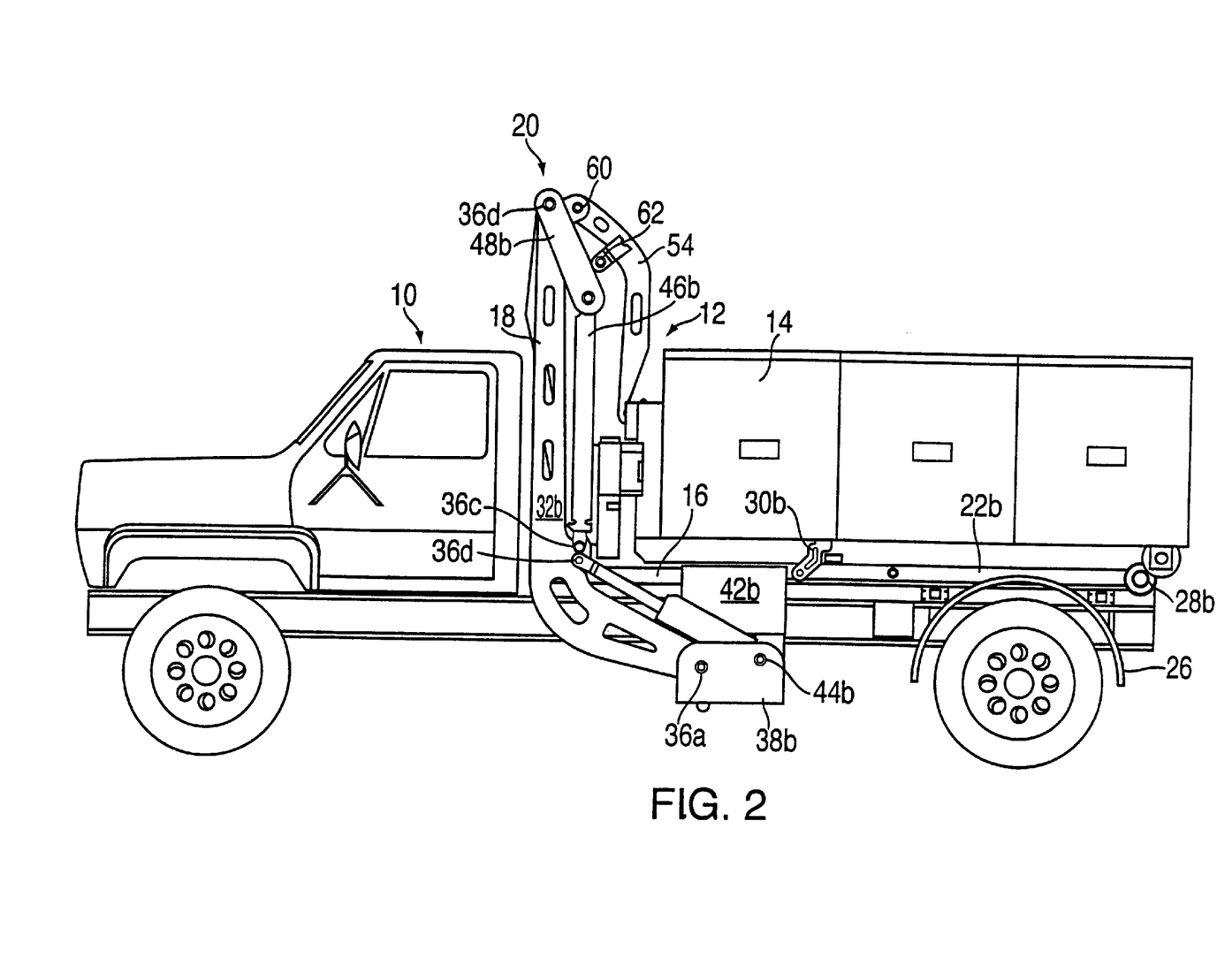
FIG. 2 is an elevational view of a flatbed truck having the lifting and transporting system of FIG. 1, with the hook of the hook arm of the lifting assembly being shown as engaging a complementary eyelet, ring or hook bar, of a container resting on the base assembly of the lifting and transporting system.

FIGS. 2 and 3 illustrate use of the hook 54 of the invention, which engages a hook bar of container 14. Hook lift 54 may secure an eyelet, ring, hook bar, etc., of container 14, or in the alternative, may secure a multi-body loading plate 80, which supports and secures a container loaded onto vehicle 10. (FIGS. 2 and 3 illustrate the use of a multi-body loading plate, however, the use of such multi-body loading plate is optional and, therefore, not required for practicing the present invention.) In FIG. 3, hydraulic hook lift cylinder 64 is shown as being extended, thereby raising hook 54 via pivot point 62; this, in turn, raises the forward end of container 14 so that the bottom of the container being unloaded (or the bottom of the multi-body loading plate, if such is used) is in contact with pair of rollers 28a, 28b. Once raised, as in FIG. 3, container 14 may be moved rearward by pivotal movement of lift assembly 20 and boom 18. Movement of the lift assembly and the substantially L-shaped boom is shown in FIG. 5 (which illustrates use of the tilt assembly arrangement of the invention.) As the boom and lift assembly is pivotally moved toward the rear of the vehicle, it would be possible to lower the boom and lift assembly by retracting hydraulic lift cylinders (or other lifting means) 40a, 40b (see, FIG. 5), thereby permitting rearward unloading of container 14.

In order that the substantially L-shaped boom 18 is able to properly pivot, it is important that lift plates 38a, 38b, along with pivot points 36a, 44b be situated at a point along base frame 16, so that the lower portions of main two segments 32a, 32b of boom 18 are able to be pivoted so that the upper portion of each of said segments is substantially upright (and preferably closely adjacent the passenger cab of the vehicle) when a loading operation has been completed (see, especially, FIG. 2.)

Lift assembly 20, as mentioned above, further includes a tilt plate 76 and fork frame 77 arrangement. Fork frame 77 of the present invention, which allows for rearward loading and unloading of containers from base assembly 16, is best illustrated in FIGS. 4–7 of the accompanying drawing figures. In FIG. 7, cross-tube 52b is shown as having tilt cylinders 70, 72, extending downward therefrom to the back face of rotator plate 74, having bearing shield 75, which, in turn, supports tilt assembly having lifting forks, or fork arms, 78a, 78b of fork frame 77. Rotator plate 74 is attached to an inner swing arm 73 and is attached to the bearing shield itself in order to allow for rotation.

In what is, itself, a novel feature of the present invention, fork arms 78a, 78b of fork frame 77 are, preferably, constructed to be horizontally foldable, such that each fork arm may be folded outwardly to be perpendicular to the back, outer surface of the passenger cab of vehicle 10 when in use, and horizontally folded to be parallel to the back outer surface of the passenger cab when the fork frame arrangement is not being used.

FIG. 5 illustrates the manner in which the tilt plate 76 and fork frame 77 assembly of the invention operates to unload a container in a rearward manner from a vehicle. Boom assembly 18 and lift assembly 20 are able to be pivotally moved in a rearward direction of base assembly 16. By retracting lift cylinders 40a (not shown), 40b, substantially L-shaped boom 18 and lift assembly 20 are lowered. Substantially simultaneously, hydraulic cylinder 46b is extended, thereby extending outer swing plate 48b and extending the tilt plate 76 and fork frame 77 arrangement of the invention, which lowers container 14 rearward and downward behind the rear end of vehicle 10.

Figure 6:
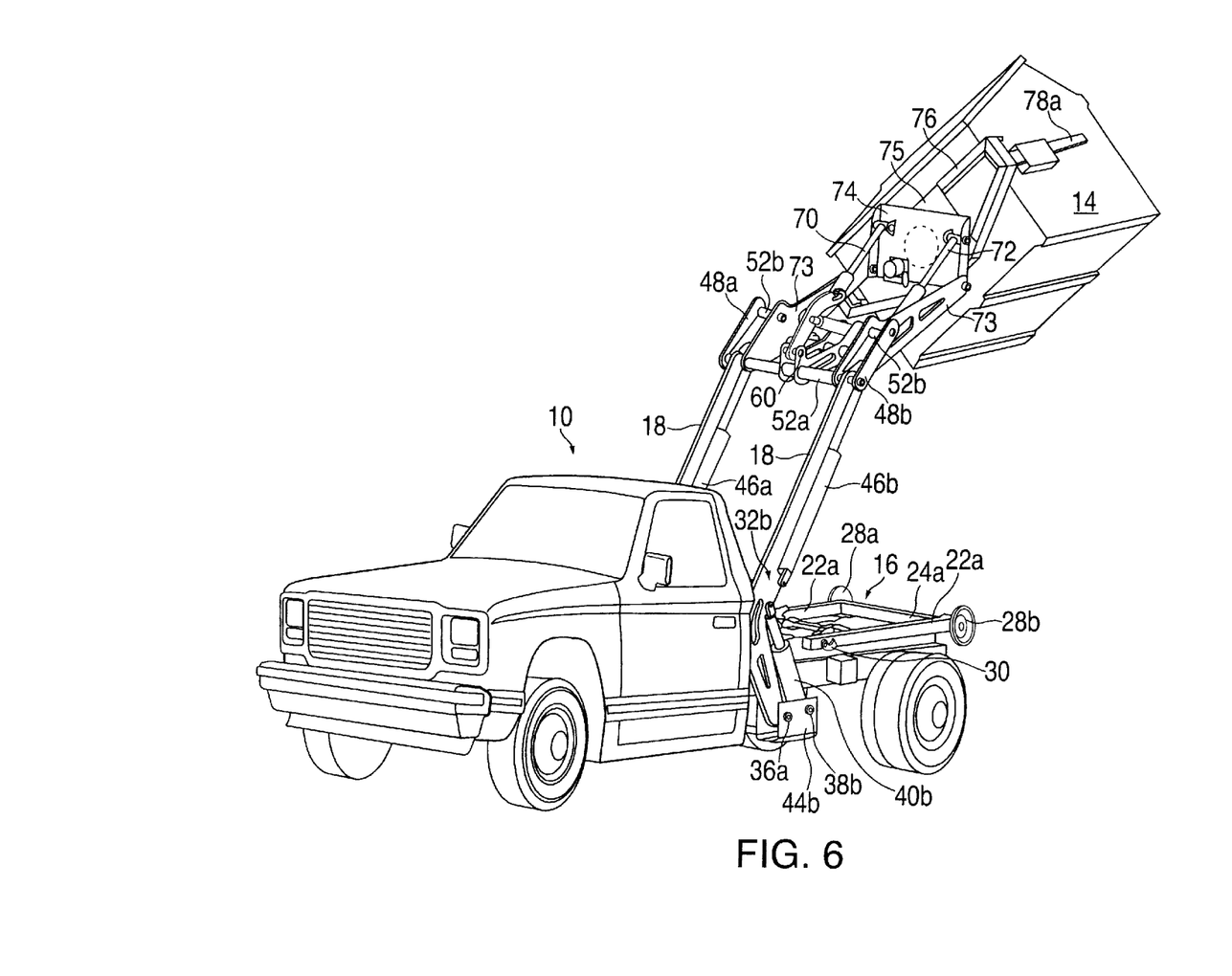
FIG. 6 is a perspective view of the lifting and transporting system of FIG. 4 showing the container of FIG. 4 being raised by the lifting forks of the fork frame arrangement of the lift assembly and rotated at a 45° angle.

FIG. 6 shows an alternative embodiment of the invention, in which rotator plate 74, holding the tilt plate/fork frame arrangement of the invention, is rotated relative to tilt plate 76 for assisting in unloading, container 14. A continuous rotation of tilt plate 76 of 360° is possible.

Figure 8:
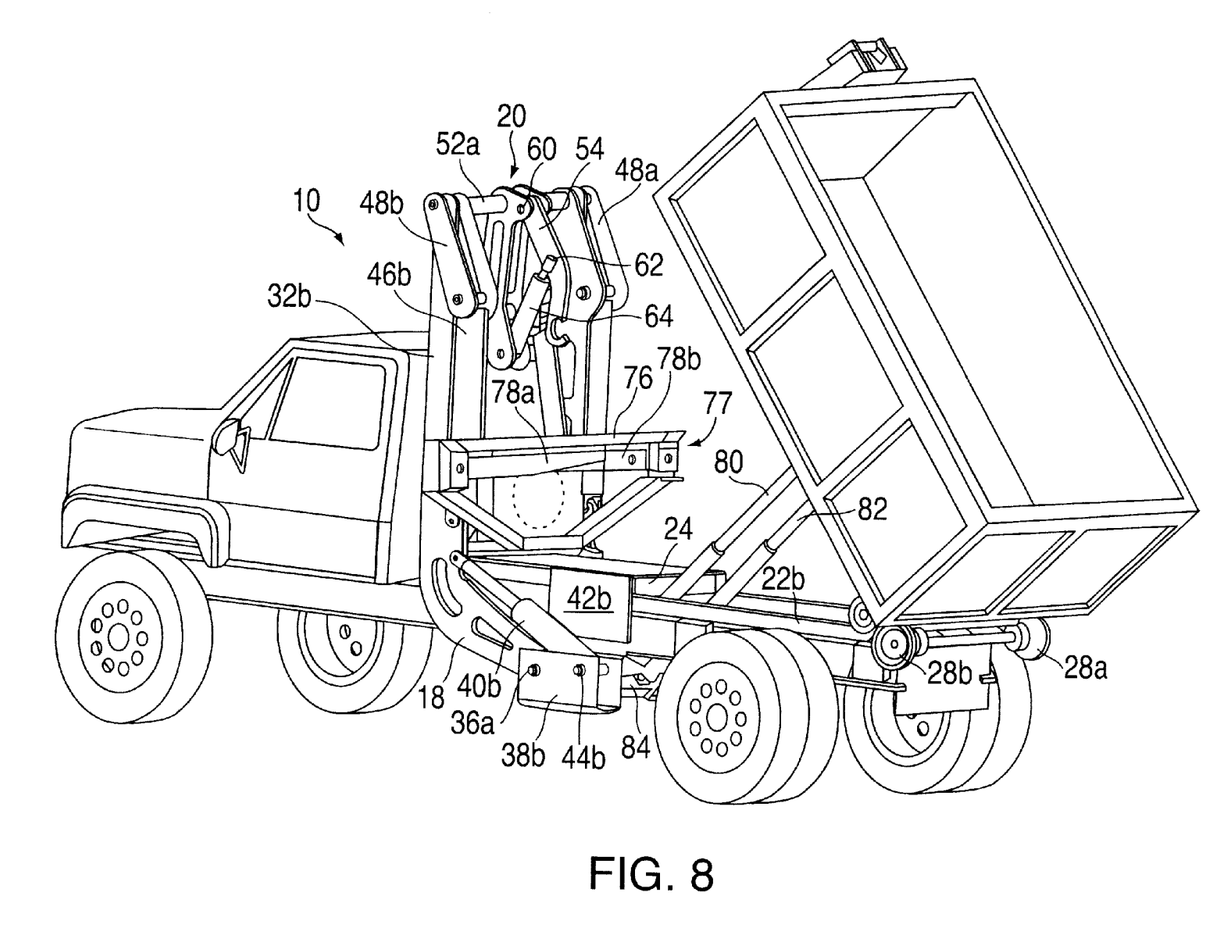

Finally, in yet a further, preferred embodiment of the present invention, in which a pair of hydraulic cylinders 80, 82 extend from a cross-member assembly 84, connecting lift plate 38a (not shown) and lift plate 38b, for raising, at an angle, a carrying container resting on base assembly 16 of the invention, for the rearward dumping of contents from container 14. The dumping angle shown in FIG. 8 is 50° relative to the base assembly.

While particular hydraulic drive means have been disclosed, it will be appreciated that other types of drive means (e.g., electrical motors) could be suitably utilized without departing from the scope of the present invention.

Finally, it should be appreciated that, although the present invention is specifically intended and useful for handling trash and refuse roller-type containers, it could be used for lifting and transporting a wide variety of loads, such as waste oil, cable bodies and grain, to name just a few.

While only several embodiments of the present invention have been shown and described, it will be obvious to those skilled in the art that many modifications may be made to the present invention without departing from the spirit and scope thereof.

What is claimed is:

1. A vehicle for lifting and transporting a container which is loaded and unloaded from the rear of the vehicle, said vehicle comprising:

a base assembly attached to the vehicle, said base assembly including a horizontally-extending flat bed portion on which said base assembly is supported;

a substantially L-shaped boom pivotably attached to said base assembly and including means for pivoting said substantially L-shaped boom relative to said base assembly, said substantially L-shaped boom having two segments connected to one another with a first segment of said two segments being pivotably attached to a left-side of said base assembly and a second segment of said two segments being pivotably attached to a right-side of said base assembly, with each of said two first and second segments having an upper portion and a lower portion with said lower portions being at an obtuse angle of from over 90° to approximately 140° relative to said upper portions, said pivotable attachment of said boom being via attachment of said lower portion of each of said segments to said base assembly, so that upon pivoting said boom via said means for pivoting, said upper portion of each of said first segment and said second segment is pivoted from a substantially vertical position to a substantially horizontal position during a container loading procedure and vice-versa during a container unloading procedure wherein said lower portion of each of said first segment and said second segment of said boom is pivotable at a point relative to said base assembly wherein said upper portion of each of said first segment and said second segment is closely adjacent an outer surface of a passenger compartment of the vehicle when said upper portions of said segments are in their said substantially vertical positions and wherein the lower portion of said first and second segments extends below, and outside of said, base assembly and below said flat bed portion of the vehicle; and a lift assembly pivotably attached to said boom for rearward loading and unloading of a container from said vehicle, said lift assembly including lifting means for pivoting said lift assembly relative to said boom.

2. The vehicle for lifting and transporting a container according to claim 1, wherein said lower portions of said first segment and said second segment of said boom are at the obtuse angle of approximately 103.5° relative to said upper portions of said segments.

3. The vehicle for lifting and transporting a container according to claim 1, wherein said base assembly includes rollers located at a distal end relative to a passenger compartment of the vehicle.

4. The vehicle for lifting and transporting a container according to claim 1, wherein said means for pivoting said substantially L-shaped boom relative to said base assembly includes a plurality of hydraulic cylinders.

5. The vehicle for lifting and transporting a container according to claim 1, wherein said lifting means for pivoting said lift assembly relative to said boom includes a plurality of hydraulic cylinders.

6. The vehicle for lifting and transporting a container according to claim 1, wherein said lifting assembly comprises a hook lift having a hook for engaging a complementary portion of a container.

7. The vehicle for lifting and transporting a container according to claim 6, said first segment and said second segment of said boom are connected to one another via a cross-member with said hook lift being pivotally attached to said cross-member.

8. The vehicle for lifting and transporting a container according to claim 7, wherein said hook lift is pivotably attached to said cross-member at substantially a mid-point between said first segment and said second segment of said boom.

9. The vehicle for lifting and transporting a container according to claim 6, wherein said lifting assembly further comprises a fork frame having lifting forks for engaging side-mounted sleeves of a container.

10. The vehicle for lifting and transporting a container according to claim 1, wherein said lifting assembly comprises a fork frame having lifting forks for engaging side-mounted sleeves of a container.

11. The vehicle for lifting and transporting a container according to claim 10, wherein there are two lifting forks for engaging one of the side-mounted sleeves on each of two sides of the container with each of said two lifting forks including means for horizontally folding each of said two lifting forks when said lifting forks are not being used to load or unload a container from the vehicle.

12. The vehicle for lifting and transporting a container according to claim 10, further comprising means for rotating said fork frame with said lift forks.

13. The vehicle for lifting and transporting a container according to claim 12, wherein said means for rotating said fork frame allows for a 360° rotation.

14. The vehicle for lifting and transporting a container according to claim 13, wherein said 360° rotation is continuous.

15. The vehicle for lifting and transporting a container according to claim 12, wherein said means for rotating comprises a rotator plate attached to an inner swing arm of said lift assembly.

16. The vehicle for lifting and transporting a container according to claim 1, further comprising a pair of lift plates with a first of said pair of lift plates being located on a left-hand side of said base assembly and a second of said lift plates being located on a right-hand side of said base assembly.

17. The vehicle for lifting and transporting a container according to claim 16, further comprising a cross-member assembly connecting said first of said pair of lift plates to said second of said pair of lift plates, said cross-member assembly having means for raising, at an angle, a carrying container resting on said base assembly.

18. The vehicle for lifting and transporting a container according to claim 17, wherein said means for raising includes at least one hydraulic cylinder.

19. The vehicle for lifting and transporting a container according to claim 1, further comprising a multi-body loading element resting atop of said base assembly for supporting, loading and unloading a container.

* * * * *